(12) United States Patent
Kuhn et al.

(10) Patent No.: US 9,105,344 B2
(45) Date of Patent: Aug. 11, 2015

(54) SHUT-OFF MECHANISM IN AN INTEGRATED CIRCUIT DEVICE

(71) Applicants: Kelin J Kuhn, Aloha, OR (US); Christopher J Jezewski, Hillsboro, OR (US); Marko Radosavljevic, Beaverton, OR (US)

(72) Inventors: Kelin J Kuhn, Aloha, OR (US); Christopher J Jezewski, Hillsboro, OR (US); Marko Radosavljevic, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 13/722,496

(22) Filed: Dec. 20, 2012

(65) Prior Publication Data

US 2014/0176182 A1   Jun. 26, 2014

(51) Int. Cl.
*G11C 16/22*   (2006.01)

(52) U.S. Cl.
CPC .................................... *G11C 16/22* (2013.01)

(58) Field of Classification Search
CPC ................................ G11C 16/22; G07F 7/082
USPC ................................................... 326/8, 37, 38
See application file for complete search history.

(56) References Cited

U.S. PATENT DOCUMENTS

| | | |
|---|---|---|
| 7,550,789 B2 * | 6/2009 | Bonaccio et al. ............. 257/209 |
| 2006/0076413 A1 * | 4/2006 | Kund et al. .................... 235/451 |
| 2008/0143373 A1 * | 6/2008 | Bonaccio et al. ................. 326/8 |
| 2009/0049548 A1 * | 2/2009 | Garbe et al. ..................... 726/22 |
| 2010/0182147 A1 * | 7/2010 | Rueping et al. ............... 340/541 |
| 2013/0206843 A1 * | 8/2013 | McCarthy ..................... 235/492 |
| 2013/0271178 A1 * | 10/2013 | Pedersen et al. .................. 326/8 |

* cited by examiner

*Primary Examiner* — Don Le
(74) *Attorney, Agent, or Firm* — Forefront IP Lawgroup, PLLC

(57) ABSTRACT

Described herein are technologies related to self-disabling feature of a integrated circuit device to avoid unauthorized access to stored data information.

24 Claims, 7 Drawing Sheets

SHUT-OFF MECHANISM IN AN INTEGRATED CIRCUIT DEVICE

BACKGROUND

A use of information and communications technology devices has become ubiquitous since the advent of a number of hand held and laptop devices such as smart phones, tablet computers, and mobile computers (e.g., netbooks, Ultrabooks, etc.). These devices are used daily in a personal level and in our corporate and institutional workplaces. To this end, there is a significant need to secure data on these devices to prevent unauthorized persons from obtaining secrets of personal, sensitive, proprietary, or of classified nature. For example, the devices need to remain being accessible and productive to its intended user but is not accessible to other individuals, competitors, rivals, groups, governments, and enemies that seek personal, economic, political, or military advantage.

Current data security solutions implements 1) a disk encryption, which refers to encryption technology that encrypts data on a hard drive; 2) a hardware based mechanisms for protecting data, where a hardware of the device allows a user to login, logout and to set different privilege levels by doing manual actions; 3) backups, which is used to recover data; etc.

DETAILED DESCRIPTION

Described herein is a technology for self-disabling feature of a wireless device to avoid unauthorized access to stored data information. More particularly, a method to protect the data information in a storage component such as static random access memory (SRAM), dynamic random access memory (DRAM), magneto resistive random access memory (MRAM) or a logic base memory is described.

In an implementation, the self-disabling feature of the wireless device includes a detecting mechanism, triggering mechanism, shut-off mechanism, and a storage mechanism. For example, the detecting mechanism may measure signals to determine if there is a deviation in a set of signals that defines a threshold for proper operations of the wireless device. For example, the detecting mechanism measures amount of radiation exposure of the wireless device or total resistance in a circuit of the wireless device. In this example, the measured signal is received and processed by the triggering mechanism.

The triggering mechanism is configured to provide a triggering signal based upon the measured signal in the detecting mechanism. For example, if the measured amount of radiation exposure exceeds a limit imposed by government regulations or if the measured total resistance signifies a physical removal of the storage component in the circuit of the wireless device, then the triggering mechanism provides the triggering signal to the shut-off mechanism. For example, the shut-off mechanism contains a high-surge voltage component to permanently cut-off electrical signals to the storage mechanism, or a micro electro mechanical system (MEMS) based hardware that is configured to temporarily lock down access to the storage component. In this example, the high-surge voltage or the MEMS based hardware may be enabled by the triggering signal.

Figure 1:
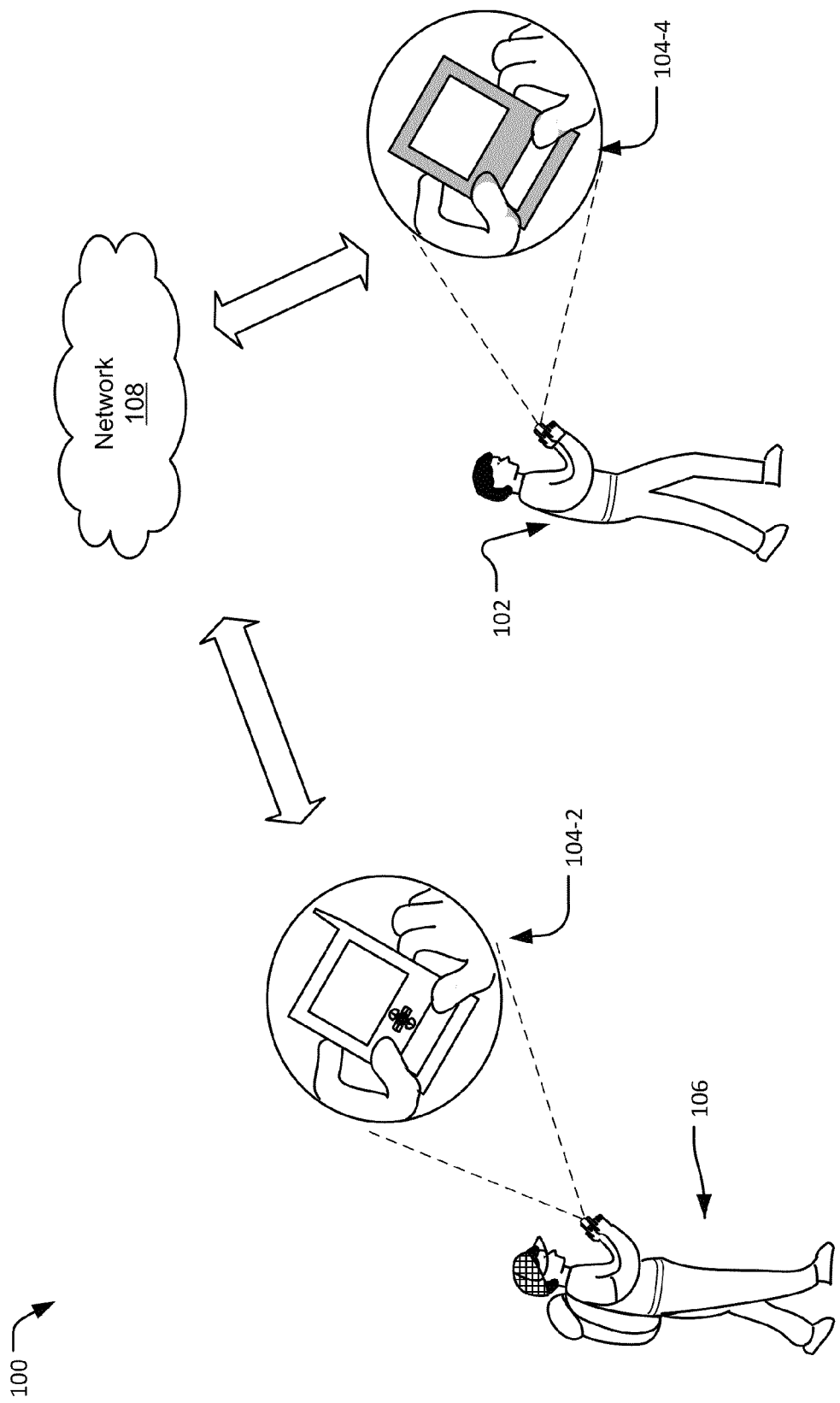
FIG. 1 illustrates an example scenario that shows a wireless device with self-disabling features to avoid unauthorized access by a third party.

FIG. 1 illustrates a scenario 100 that shows a wireless device with self-disabling features to avoid unauthorized access by a third party. As shown, scenario 100 depicts an owner 102 who is a true owner of a wireless device 104-2, and an unauthorized user 106. Furthermore, scenario 100 shows a network 108 that is utilized by the owner 102 to gain access to the wireless device 104-2 using another wireless device 104-4.

As shown, the owner 102 lost his wireless device 104-2 and that the unauthorized user 106 is now in possession of the wireless device 104-2. In this example, the owner 102 may have stored important data information (not shown) into the wireless device 104-2 before the unauthorized user 106 took possession of it. As such, the owner 102 plans to stop the unauthorized user 106 from retrieving any of the data information from the wireless device 104-2.

With continuing reference to FIG. 1, the owner 102 may utilize the wireless device 104-4 to send a remote triggering signal (not shown) through the network 108. The remote triggering signal may be a remote software triggering signal that is transmitted through the network 108 to disable any access to the data information of the wireless device 104-2. The remote triggering signal is received by the wireless device 104-2 and a self-disabling feature of the wireless device 104-2 is activated or enabled. For example, the wireless device 104-2 includes a shut-off mechanism (not shown) that cuts off electrical signal into the wireless device 104-2 when the shut-off mechanism is enabled or activated by the triggering signal.

In another example, a radio signal (not shown) such as a cellular signal, a wireless fidelity (Wi-Fi) signal, and the like, may be used by the user 102 to access the wireless device 104-2. For example, the user 102 may send the remote triggering signal through the cellular signal by sending an encrypted text messaging. In this example, the wireless device 104-2 enables its shut-off mechanism to deny access to the data information. In another example, the triggering signal may be derived from an error in biometric identification of the unauthorized user 104 or the triggering signal may be derived from multiple input password errors entered into by the unauthorized user 104. In this example, there is no need for the remote triggering signal to enable the disabling features of the wireless device 104-2; however, a local based hardware such a configured processor or a control unit within the wireless device 104-2 may provide a local triggering signal.

As depicted, the wireless device 104 may include, but not limited to, a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

Figure 2:
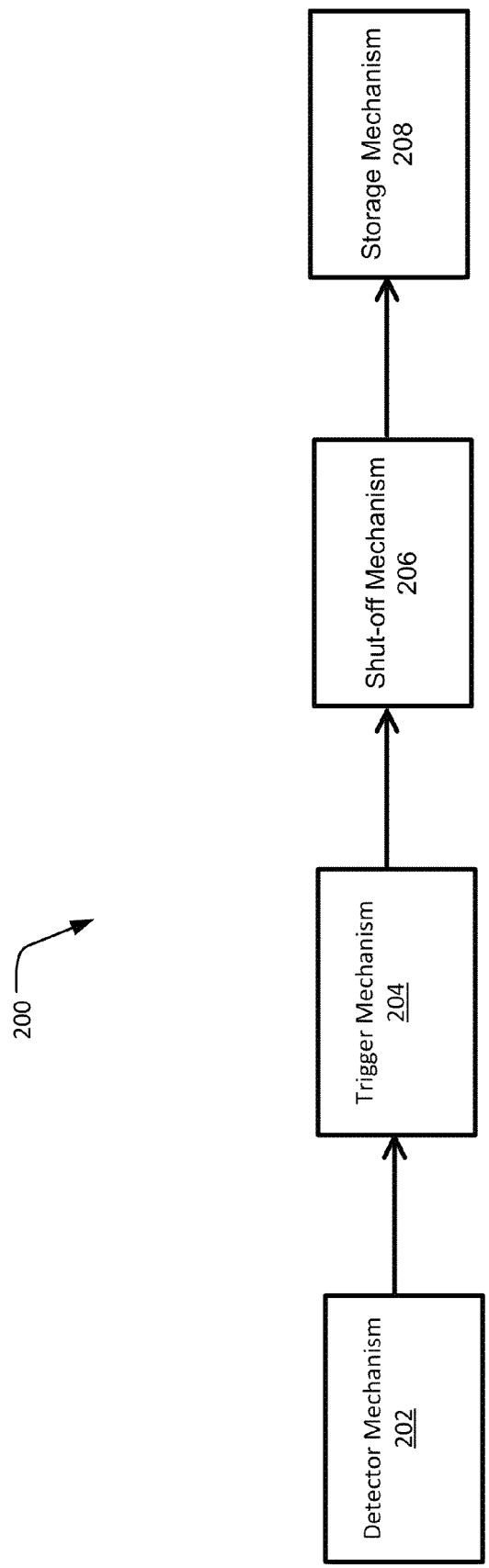
FIG. 2 illustrates an example block diagram that implements a self-disabling feature of a wireless device.

FIG. 2 illustrates a block diagram 200 that implements the self-disabling feature of the wireless device 104. Block diagram 200 shows a detecting mechanism 202, a trigger mechanism 204, a shut-off mechanism 206, and a storage mechanism 208. In an implementation, these mechanisms (i.e., detecting mechanism 202, etc.) may be fabricated in a single module such as, for example, in a single IC device. In another implementation, the detecting mechanism 202, trigger mechanism 204, and the shut-off mechanism 206 may be external to the storage mechanism 208 that may be fabricated in the single module or IC device.

In a case where the wireless device 104 is lost, the wireless device 104 may have a different power and/or network connection status at the hand of the unauthorized user 106. For example, the wireless device 104 may have drained its power battery and so, it is powered OFF, or the wireless device 104 may be powered ON but not connected to any network or radio signal, or it may be powered ON and is connected to the network or radio signal.

For example, when the wireless device 104 is powered OFF, the detecting mechanism 202 may include a sensor (now shown) that is configured to measure and compare input signals to a set of signals in the wireless device 104. For example, when the unauthorized user 106 physically takes out an IC device (not shown) that is configured as the storage mechanism 208 in the wireless device 104, the sensor in the detecting mechanism 202 may measure a change in total resistance, capacitance, and the like, in the wireless device 104 (e.g., in a motherboard where the IC device is connected). In another example, the sensor may sense high frequency vibrations due to sawing or polishing of the IC device. In these examples, the sensor may compare the measured total resistance or the high frequency vibrations to the set of signals in the wireless device 104. The set of signals may contain threshold signals (e.g., standard resistance measurements, etc.) for ideal operations or status of the wireless device 104.

As illustrated, when the wireless device 104 is powered ON but not connected to any network or radio signals, the detecting mechanism 202 may measure the signals such as the signals due to different biometric identification signals, signals due to input password errors, or signals due to global positioning system (GPS) entry in the wireless device 104. In these examples, the detecting mechanism 202 may compare these signals to corresponding set of signals (i.e., threshold signals) that are configured in the wireless device 104. For example, when the unauthorized user 106 inputs his fingerprints to the wireless device 104, the detecting mechanism 202 may compare these fingerprints to the fingerprints of the owner 102 (i.e., threshold signals) that are stored in the wireless device 104. In another example, if the wireless device 104 is located in a place that is configured in the wireless device 104 to be the place or a zone for activating its disabling feature, then the detecting mechanism 202 detects signals from GPS features of the wireless device 104 and utilizes these signals in activating the disabling feature of the wireless device 104.

As illustrated, when the wireless device 104 is powered ON and is connected to the network or radio signals, the detecting mechanism 202 may be bypassed and the user 102 may directly enable the triggering mechanism 204 such as, for example, through the network or radio signals. For example, the wireless device 104 is configured with software that enables its self-disabling feature when receiving a remote triggering signal through the network or the radio signals. In this example, the remote triggering signal is directly processed at the trigger mechanism 204. In other words, in this example, the remote triggering signal bypasses operations in the detecting mechanism 202.

In an implementation, the shut-off mechanism 206 may be configured to electrically or mechanically cut-off electrical signals to the storage mechanism 208. The cutting-off of the electrical signals may be temporarily or permanently such as when the IC device is permanently damaged by a surging voltage (not shown) from the shut-off mechanism 206. For example, the shut-off mechanism 206 may supply a high surging voltage from a charged capacitor within the IC device or from a supply voltage across the motherboard in the wireless device 104 to permanently damage the IC device. In another example, the shut-off mechanism 206 may include a MEMS based hardware lock to temporarily cut-off the electrical signals that is utilized to access the storage mechanism 208.

In an implementation, the high surging voltage from the shut-off mechanism 206 may come from the charged capacitor or the supply voltage. The high surging voltage may contain a value (e.g., 5 Volts) that may be sufficient enough to permanently cut-off the electrical signals within the IC device. Typically, the IC device and more particularly the storage mechanism 208 is made up of multiple numbers of transistors (not shown). For proper transistor operations, a gate terminal of this transistor is coupled to an input control voltage Vin or a biasing voltage. In this case, the Vin switches between several predetermined control voltages. However, these control voltages are sized or configured so as not to cause any damage to PN junction of the transistor. As such, the high surging voltage from the shut-off mechanism 206 may be configured to supply a voltage that is above a threshold voltage (i.e., maximum voltage for proper operations) to permanently cut-off the electrical signals in the storage mechanism 208. In other words, the high surging voltage may cause irreversible damage to the PN junction of the transistor that acts as the storage mechanism 208.

In an implementation, the MEMS based hardware lock is a recordable locking device that contains series of tiny notched gears that mechanically move to an unlocked position only when the right code is entered. In the case where the unauthorized user 106 enters a wrong password, the MEMS based hardware lock may temporarily cut-off the electrical signals into the storage mechanism 208. In this example, access to data information in the wireless device 104 is mechanically disabled until the owner 102 resets the wireless device 104 with a proper password.

With continuing reference to FIG. 2, the block diagram 200 may be implemented to comply with export regulations such as chip needs to exhibit failure within a defined total ionizing dose (TID). This export regulation was put in place in the interest of national security. For example, common radiation induced effects may include: Bit Error Rate (BER), environment induced data errors referred to as Soft Error Rate (SER), failure in time (FIT), operating system or applications crashes are Detected Uncorrectable Error (DUE), or bad data written to disks known as Silent Data corruption, (SDC).

Although the IC device may be robust enough to withstand radiation that is above the defined TID for export regulation purposes, the block diagram 200 may similarly be implemented to disable access to the IC device. For example, the detector mechanism 202 utilizes a dosimeter (not shown) that is configured to measure amount of radiation. In this example, if the amount of radiation measured exceeds TID regulation limits regulation limits, then the trigger mechanism 204 may provide the triggering signal to the shut-off mechanism 206.

To this end, the high-surging voltage from the shut-off mechanism 206 may cause irreversible damage to the storage mechanism 208.

Figure 3:
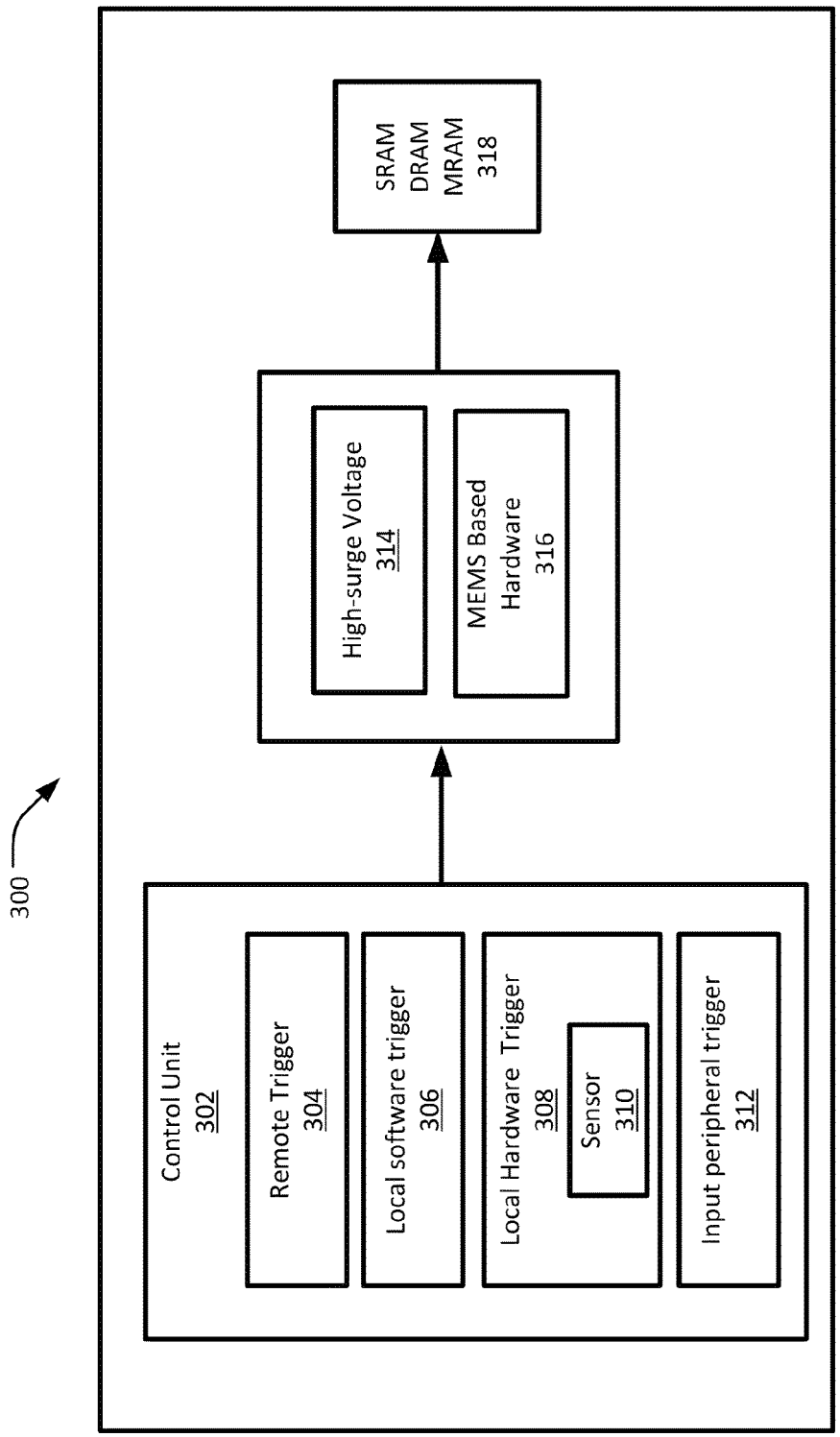
FIG. 3 illustrates an example integrated circuit (IC) device that implements different mechanisms in a self-disabling feature of a wireless device.

FIG. 3 illustrates an example IC device 300 that implements the different mechanisms (e.g., detecting mechanism 202, etc.) of the self-disabling feature of the wireless device 104. The IC device 300 may be, for example, a processor or a component such as a storage component of the wireless device 104.

As shown, the IC device 300 may include a control unit 302, a remote trigger 304, a local software trigger 306, a local hardware trigger 308, an input peripheral trigger 312, a high-surge voltage 314, a MEMS based hardware 316, and static random access memory (SRAM)/dynamic random access memory (DRAM)/magneto-resistive random access memory (MRAM) 318.

In a case where the wireless device 104 is powered ON and is further connected to the network 108 or the radio signal, the remote software trigger 304 may process a received remote triggering signal through the network 108 or the radio signal. For example, when the owner 102 communicates a text message that is configured to activate the shut-off mechanism of the IC device 300, the remote trigger 304 may be configured to process the received text message and transmit a triggering signal to the shut-off mechanism of the IC device 300. In this example, the high-surge voltage 314 may supply a voltage that is above configured threshold voltage (i.e., maximum voltage of operations) of the IC device 300 or more particularly, the SRAM/DRAM/MRAM 318.

In a case where the wireless device 104 is powered ON but not connected to the network 108 or any radio signal, the local software trigger 306 may be configured to transmit the triggering signal to the shut-off mechanism of the IC device 300. For example, if the local software trigger 306 is configured to interpret a lack of activity in the wireless device 104 for the last twenty four hours as stolen wireless device 104, then the local software trigger 306 is configured to transmit the triggering signal to the shut-off mechanism if no activity is detected in the wireless device 104 within the last 24 hours.

In a case where the wireless device 104 is powered OFF, the local hardware trigger signal 308 may be configured to transmit the triggering signal to the shut-off mechanism of the IC device 300. For example, when the IC device 300 is taken out from the wireless device 104, the local hardware trigger signal 308 may be configured to detect this action through a sensor 310 (e.g., Ohm Meter for resistance measurements) and transmits the triggering signal to the shut-off mechanism of the IC device 300. Since there is no power in the wireless device 104 in this example, the charged capacitor may be utilized to deliver the voltage that is above the voltage threshold of the IC device 300.

In a case where the wireless device 104 is powered ON, the local hardware trigger signal 308 may be configured to transmit the triggering signal to the shut-off mechanism of the IC device 300. For example, the sensor 310 may be a dosimeter that measures amount of radiation to comply with TID regulation limits. In this example, upon reaching the TID regulation limits, the local hardware trigger signal 308 transmits the triggering signal to the shut-off mechanism of the IC device 300. The shut-off mechanism may then supply the high-surging voltage to destroy or disable access to the SRAM/DRAM/MRAM 318.

In a case where the wireless device 104 is powered ON but not connected to the network 108 or any radio signal, the input peripheral trigger 312 is configured to transmit the triggering signal to the shut-off mechanism of the IC device 300. For example, when multiple input password errors are detected from a keyboard input peripheral of the wireless device 104, the MEMS based hardware 316 may temporarily lock down the electrical signal that is utilized to access the SRAM/DRAM/MRAM 318. Other input peripherals of the wireless device 104 may include a sound/voice input peripheral, camera, and the like.

In an implementation, the high surge voltage 314 may permanently cut-off the electrical signals to the SRAM/DRAM/MRAM 318. For example, the SRAM/DRAM/MRAM 318 is composed of transistors. In this example, a surging voltage from the charged capacitor or a voltage supply (not shown) may cause an irreversible damage to the PN junction of the transistors that forms the SRAM/DRAM/MRAM 318. In a case where the local hardware trigger 308 is utilized when the wireless device 104 is powered OFF, the charged capacitor is utilized to supply the surging voltage since the voltage supply is zero due to power OFF condition of the wireless device 104.

Figure 4:
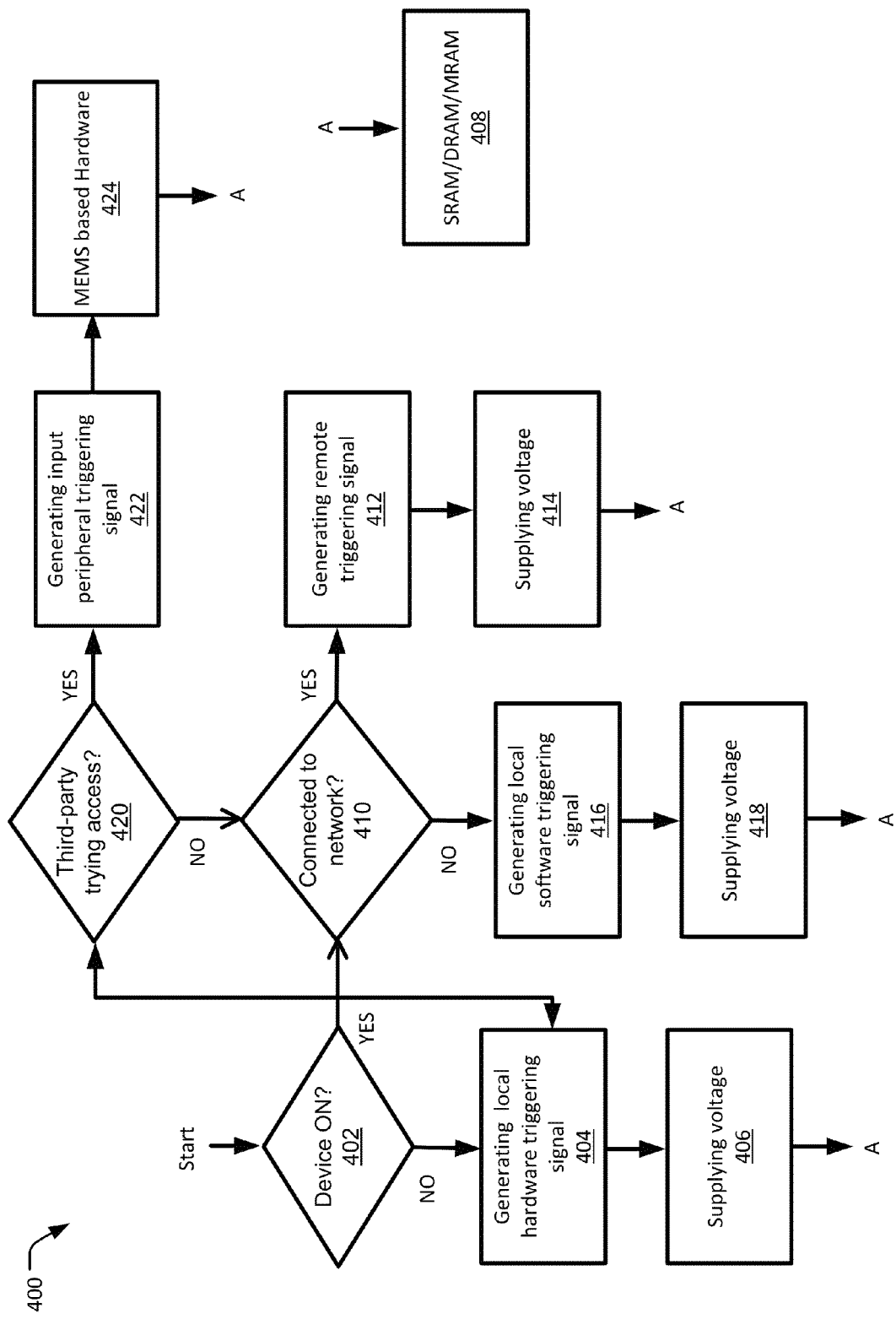
FIG. 4 illustrates an example flowchart of a method that implements self-disabling feature of a wireless device.

FIG. 4 shows an example process flowchart 400 illustrating an example method of implementing the self-disabling feature of the wireless device 104. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, determining if a wireless device is powered ON. For example, if the wireless device (e.g., wireless device 104) is powered OFF, then following a NO signal at block 404, a local hardware trigger component (e.g., local hardware trigger 308) of an IC device (e.g., IC device 300) may be configured to generate a local hardware triggering signal based from signal measurements by a detecting mechanism (e.g., sensor 310) in the wireless device 104. For example, the sensor 310 may be an ohm meter that measures changes in total resistance in circuitry of the wireless device 104 if the IC device 300 is physically removed from the circuitry. In this example, the local hardware trigger 308 processes the change in total resistance and generates the local hardware triggering signal.

In another example, the sensor 310 is configured to detect high frequency vibrations due to sawing or polishing of the IC device 300. In this example, the local hardware trigger 308 processes the change in vibrations and generates the local hardware triggering signal.

At block 406, a voltage is supplied based on the received local hardware triggering signal. For example, if the received local hardware triggering signal indicates the change in total resistance in the circuitry of the wireless device 104, then a high-surge voltage component (e.g., high-surge voltage 314) may generate the voltage that is sufficient to cause irreversible damage to SRAM/DRAM/MRAM component (e.g., SRAM/DRAM/MRAM 318) at block 408. In this example, a charged capacitor may be configured to supply the voltage since the wireless device is powered OFF.

In a case where the sensor 310 is a dosimeter that measures radiation exposure of the IC device 300, the wireless device 104 may be at either powered OFF or powered ON state. For example, the dosimeter may be a transducer that measures the radiation even if the wireless device 104 is powered OFF. In this example, the charged capacitor may generate the voltage to cause irreversible damage to SRAM/DRAM/MRAM at block 408. On the other hand, if the wireless device 104 is powered ON, then a voltage supply may also generate the voltage to cause irreversible damage to SRAM/DRAM/MRAM at block 408.

With continuing reference to block 402, if the wireless device 104 is powered ON, then following a YES signal at block 410, a determination on whether the wireless device 104 is connected to a network is performed.

If the wireless device 104 is connected to the network (e.g., network 108), then following a YES signal at block 412, remote trigger component (e.g., remote trigger 304) is configured to generate a remote triggering signal based from received signals through the network 308 or other radio signals. For example, if an owner (e.g., owner 102) communicates a text message that is configured to enable a shut-off mechanism of the wireless device 104, then the remote trigger 304 may process the received text message and generates the remote triggering signal to the high-surge voltage 314 at block 414. Since the wireless device is powered ON, the high-surge voltage 314 may utilize the charged capacitor or a voltage supply to supply the voltage that permanently cuts-off the electrical signals in the SRAM/DRAM/MRAM at block 408.

With continuing reference to block 410, if the wireless device 104 is powered ON but not connected to the network 308, then a local software trigger (e.g., local software trigger 306) at block 416 may be configured to generate a local software triggering signal to enable the high-surge voltage at block 418 to permanently cut-off the electrical signals in the SRAM/DRAM/MRAM at block 408. For example, if the wireless device 104 is configured to enable its shut-off mechanism upon detection of lack of activity for a certain time (e.g., no activity in the wireless device for 24 hours), then the local software trigger 306 may receive and process this lack of activity signal and generates the local software triggering signal.

Back to block 402, when the wireless device 104 is powered ON, a determination at block 420 of whether a third-party is trying to access data information is performed. For example, if the third party (e.g., unauthorized user 106) is entering a biometric identification such as a fingerprint, then an input peripheral trigger component (e.g., input peripheral trigger 312) may be configured to detect accuracy of the fingerprint of the unauthorized user 106 and may generate an input peripheral triggering signal to enable a MEMS based hardware (e.g., MEMS based hardware 316) at block 422. For example, the MEMS based hardware at block 424 temporarily shuts-off the electrical signals that are utilized to access the SRAM/DRAM/MRAM at block 408. In a case where there is no third-party at block 420, then following the NO signal at block 410, the process at block 410 as discussed above may apply.

Figure 5:
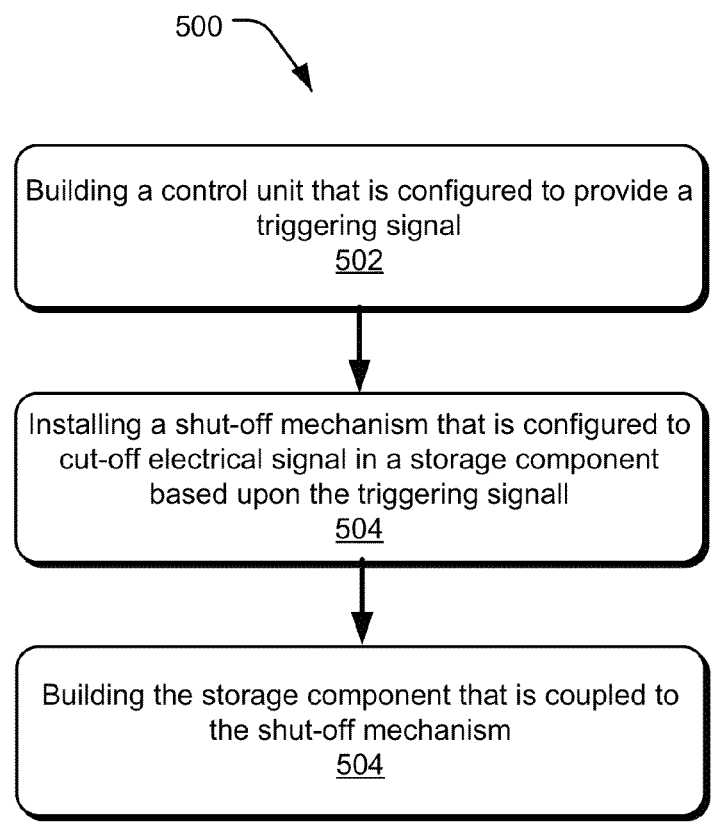
FIG. 5 illustrates an example flowchart of manufacturing an integrated circuit (IC) device with a self-disabling feature.

FIG. 5 shows an example process flowchart 400 illustrating an example method of manufacturing an IC device that implements self-disabling mechanism to avoid unauthorized access to data memory. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, building a control unit that is configured to provide triggering signals based upon a measured signal. For example, the control unit (e.g., control unit 302) may be configured to receive and process the measured signal that is supplied by a detector mechanism such, for example, a sensor (e.g., sensor 310). In this example, the control unit 302 is configured to transmit the triggering signals based from the measured signal. For example, the sensor 310 is configured to measure the signal that represents a password input from a user. In this example, the sensor is pre-configured to check if the password input is authorized or unauthorized. In another example, the sensor may measure total resistance in a circuitry of the IC device in a case where the IC device is taken out from the wireless device 104. In these examples, the control unit 302 may transmit the triggering signals based from the measured unauthorized password input signals or total resistance signals.

At block 504, installing a shut-off mechanism that is configured to cut-off electrical signal into the IC device. For example, the shut-off mechanism may utilize a high-surge voltage component (e.g., high-surge voltage 314) to supply the voltage that permanently cuts-off the electrical signals in the IC device 300 or storage component such as SRAM/DRAM/MRAM 318. In another example, the shut-off mechanism may utilize the MEMS hardware based switch to mechanically lock down temporarily the access to the storage component in the IC device 300. This locking down may be reset by owner 102 who is aware of reset password to unlock the wireless device 104.

At block 506, building the storage component that is coupled with the shut-off mechanism.

Figure 6:
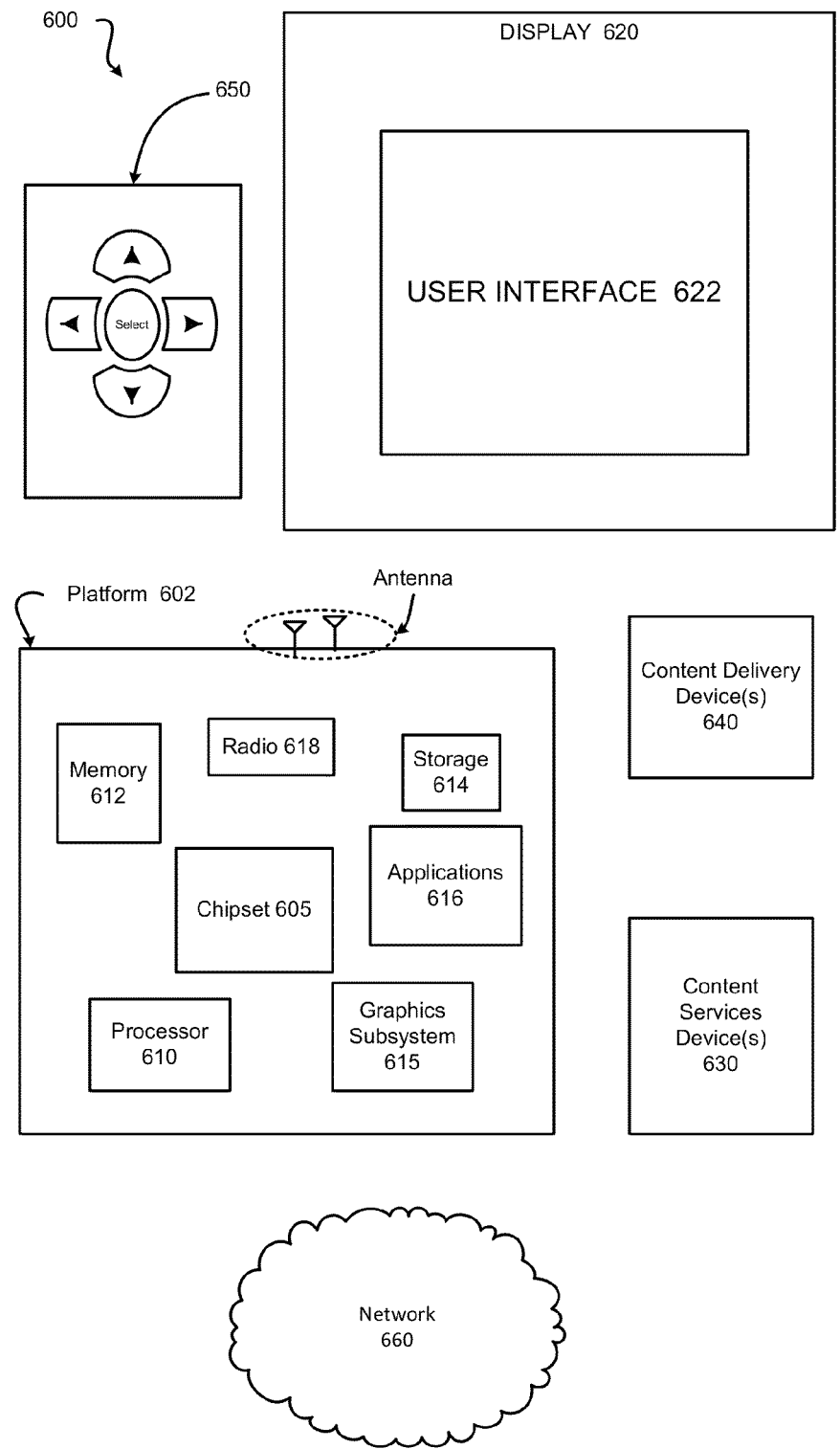
FIG. 6 illustrates an example computing device that implements self-disabling feature of a wireless device.

FIG. 6 illustrates another example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth that is coupled to the PIC as discussed in FIG. 2 above.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off" In addition, chipset 605 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 7:
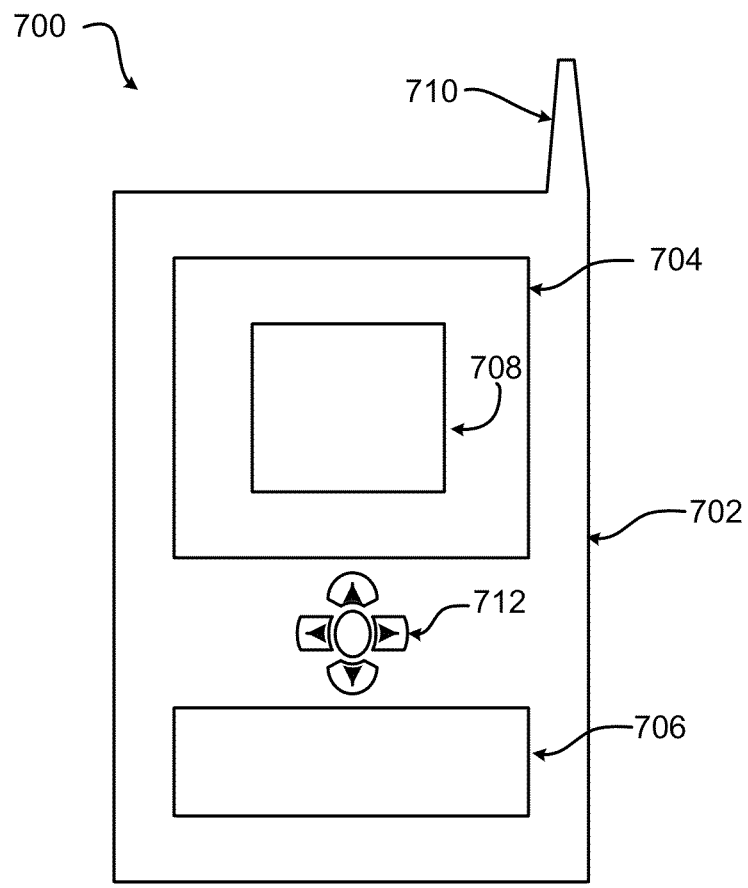
FIG. 7 illustrates an example device that implements self-disabling feature of a wireless device.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An integrated circuit (IC) device comprising:
   a sensor configured to measure a signal;
   a control unit configured to process the measured signal and provide a triggering signal based upon the measured signal;
   a high-surge voltage component coupled to the control unit, the high-surge voltage component configured to provide a voltage based upon the triggering signal, wherein the provide voltage is greater than a voltage threshold of a storage component in the IC device, the voltage threshold includes a maximum voltage of operation of the storage component.

2. The IC device as recited in claim 1, wherein the sensor is a dosimeter that is configured to measure amount of radiation exposure of the IC device.

3. The IC device as recited in claim 1, wherein the sensor is an ohm meter that is configured to measure total resistance in a circuitry of the IC device.

4. The IC device as recited in claim 1, wherein the measured signal includes measured biometric identification signals.

5. The IC device as recited in claim 1, wherein the control unit is configured to generate one or more of a remote triggering signal, a local software triggering signal, or a local hardware triggering signal.

6. The IC device as recited in claim 1, wherein the high-surge voltage component includes one or more of a charged capacitor or a voltage supply that is configured to generate the supplied voltage that is above the threshold voltage of the storage component.

7. The IC device as recited in claim 1, wherein the high-surge voltage component includes a charged capacitor that is configured to generate the supplied voltage when a wireless device is powered OFF.

8. A wireless device comprising: The IC device as recited in claim 1.

9. The IC device as recited in claim 1 further comprising a micro electro mechanical system (MEMS) coupled to the control unit, the MEMS configured to mechanically and temporarily lock access to the IC device based upon the triggering signal from the control unit.

10. A wireless device comprising:
    a processor;
    a memory coupled to the processor, the memory comprising:
      a detecting mechanism that is configured to provide a measured signal;
      a trigger mechanism coupled to the detecting mechanism, the trigger mechanism is configured to process the measured signal to provide a triggering signal;
      a shut-off mechanism that receives the triggering signal, the shut-off mechanism is configured to cut an electrical signal to a storage mechanism of the wireless device.

11. The wireless device as recited in claim 10, wherein the detecting mechanism provides the measured signal that includes amount of radiation exposure of the wireless device.

12. The wireless device as recited in claim 10, wherein the detecting mechanism provides the measured signal that includes biometric identification input signals.

13. The wireless device as recited in claim 10, wherein the detecting mechanism provides the measured signal that includes password input signals to access the wireless device.

14. The wireless device as recited in claim 10, wherein the triggering mechanism includes a control unit that is configured to generate a remote triggering signal, a local software triggering signal, or a local hardware triggering signal.

15. The wireless device as recited in claim 10, wherein the shut-off mechanism is configured to supply a voltage that is greater than a voltage threshold of the storage mechanism, the voltage threshold includes a maximum voltage of operation of the storage mechanism, the storage mechanism includes a static random access memory (SRAM), a dynamic random access memory (DRAM), or a magneto-resistive random access memory (MRAM).

16. The wireless device as recited in claim 10, wherein the shut-off mechanism includes a micro electro mechanical system (MEMS) that is configured to mechanically cut-off the electrical signal to the storage mechanism.

17. The wireless device as recited in claim 10, wherein the shut-off mechanism includes a charged capacitor or voltage supply.

18. The wireless device as recited in claim 10, wherein the shut-off mechanism includes a charged capacitor to supply a voltage that is above threshold voltage of the memory when the wireless device is powered OFF.

19. A method of shutting-off electrical signals in an integrated circuit (IC) device, the method comprising:
    receiving a signal, the signal includes a measured signal, a remote triggering signal, a local hardware triggering signal, or a local software triggering signal;
    providing a triggering signal based upon the received signal;
    cutting-off electrical signals in the IC device based on the triggering signals, wherein the cutting-off of the electrical signals utilizes a high-surge voltage or micro electro mechanical system (MEMS) based hardware lock.

20. The method as recited in claim 19, wherein the measured signal includes amount of radiation exposure of the IC device, password input signals, biometric identification signals, resistance measurements, or input peripheral signals.

21. The method as recited in claim 19, wherein the remote triggering signal includes a message communicated through a network or radio signals, the message is configured to enable providing of the triggering signal.

22. The method as recited in claim 19, wherein the local software triggering signal includes providing of the triggering signal when the IC device is not connected to a network or radio signal.

23. The method as recited in claim 19, wherein the cutting-off of the electrical signals includes supplying a voltage that is greater than a voltage threshold of a storage component in the IC device, the voltage threshold includes a maximum voltage of operation of the storage component, the threshold component includes static random access memory (SRAM), a dynamic random access memory (DRAM), or a magneto-resistive random access memory (MRAM).

24. The method as recited in claim 19, wherein the cutting-off of the electrical signals includes a micro electro mechanical system (MEMS) that is configured to mechanically cut-off temporarily the electrical signal in a storage component of the IC device.

* * * * *